US012742793B2

(12) United States Patent
Tumolo et al.

(10) Patent No.: US 12,742,793 B2
(45) Date of Patent: Sep. 22, 2026

(54) SYSTEM AND METHOD FOR DETERMINING AN ENVIRONMENTAL PARAMETER DISTRIBUTION

(71) Applicant: SIGNIFY HOLDING B.V., Eindhoven (NL)

(72) Inventors: Massimo Tumolo, Utrecht (NL); Marcellinus Petrus Carolus Michael Krijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 425 days.

(21) Appl. No.: 18/023,392

(22) PCT Filed: Sep. 2, 2021

(86) PCT No.: PCT/EP2021/074245
§ 371 (c)(1),
(2) Date: Feb. 27, 2023

(87) PCT Pub. No.: WO2022/049185
PCT Pub. Date: Mar. 10, 2022

(65) Prior Publication Data

US 2023/0324429 A1 Oct. 12, 2023

(30) Foreign Application Priority Data

Sep. 3, 2020 (EP) .................................... 20194302

(51) Int. Cl.
*G01P 5/00* (2006.01)
*A01G 7/02* (2006.01)
(Continued)

(52) U.S. Cl.
CPC ................ *G01P 5/001* (2013.01); *A01G 9/26* (2013.01); *A01G 7/02* (2013.01); *A01G 9/249* (2019.05); *G06F 3/14* (2013.01)

(58) Field of Classification Search
CPC .. G01P 5/001; A01G 9/26; A01G 7/02; A01G 9/249; A01G 9/246; G06F 3/14; Y02A 40/25
See application file for complete search history.

(56) References Cited

U.S. PATENT DOCUMENTS 5,040,329 A * 8/1991 Michaloski ............ A01G 7/045 47/DIG. 6
7,676,280 B1 3/2010 Bash et al.
(Continued)

FOREIGN PATENT DOCUMENTS

CN 103995553 A 8/2014
CN 106662352 A 5/2017
(Continued)

OTHER PUBLICATIONS

T. Bartzanas et al., “Numerical simulation of the airflow and temperature distribution in a tunnel greenhouse equipped with insect-proof screen in the openings”, Computers and Electronics in Agriculture, 34 (2002) 207-221.*
(Continued)

*Primary Examiner* — Alexander Satanovsky

(57) ABSTRACT

This disclosure relates to a system for determining a distribution in a greenhouse of values of an environmental parameter. The system comprises one or more air flow sensors for measuring a magnitude and/or direction of air flow at first one or more positions in the greenhouse. The system further comprises one or more environmental sensors for measuring the environmental parameter at second one or more positions in the greenhouse. The system also comprises a data processing system that is configured to receive first signals from the one or more air flow sensors. The first signals are indicative of the respective magnitudes and/or directions of air flow at the respective first one or more positions in the greenhouse. The data processing system is
(Continued)

also configured to receive second signals from the one or more environmental sensors. The second signals are indicative of the respective values of the environmental parameter at the respective second one or more positions in the greenhouse. The data processing system is also configured to determine, based on the first signals and based on the second signals, values of the environmental parameter at third one or more positions in the greenhouse thus determining the distribution in the greenhouse of values of the environmental parameter. Herein the third one or more positions are different from the second one or more positions. This disclosure further relates to a computer-implemented method for determining such distribution.

17 Claims, 5 Drawing Sheets

(51) Int. Cl.

| | |
|---|---|
| ***A01G 9/24*** | (2006.01) |
| ***A01G 9/26*** | (2006.01) |
| ***G06F 3/14*** | (2006.01) |

(56) References Cited

U.S. PATENT DOCUMENTS

| | | | | |
|---|---|---|---|---|
| 10,481,141 | B2 | 11/2019 | Chang et al. | |
| 2011/0287705 | A1 | 11/2011 | Kamp | |
| 2015/0233772 | A1 | 8/2015 | Atkinson et al. | |
| 2017/0035008 | A1 | 2/2017 | Ellins et al. | |
| 2017/0045548 | A1* | 2/2017 | Booij | G01P 5/001 |
| 2017/0127622 | A1 | 5/2017 | Hong | |
| 2020/0134741 | A1 | 4/2020 | Bongartz et al. | |
| 2020/0184153 | A1* | 6/2020 | Bongartz | A01G 9/249 |
| 2020/0265330 | A1* | 8/2020 | Ishikawa | G06V 20/00 |

FOREIGN PATENT DOCUMENTS

| | | | | |
|---|---|---|---|---|
| CN | 110081576 | A | 8/2019 | |
| IN | 202041013140 | A | 5/2020 | |
| KR | 20190031768 | A | 3/2019 | |
| KR | 101935482 | * | 4/2019 | G06Q 50/02 |
| WO | 2016175122 | A1 | 11/2016 | |

OTHER PUBLICATIONS

Wei et al., "Three-dimensional unsteady-state simulation of temperature field in Venlo greenhouse under variable boundary conditions," Journal of Agricultural Machinery, vol. 45, No. 11, Nov. 30, 2014.

Chinese Communication, with English Translation, dated Jan. 10, 2026 in corresponding Chinese Patent Application No. 202180054305.9.

* cited by examiner

SYSTEM AND METHOD FOR DETERMINING AN ENVIRONMENTAL PARAMETER DISTRIBUTION

CROSS-REFERENCE TO PRIOR APPLICATIONS

This application is the U.S. National Phase application under 35 U.S.C. § 371 of International Application No. PCT/EP2021/074245, filed on Sep. 2, 2021, which claims the benefit of European Patent Application No. 20194302.4, filed on Sep. 3, 2020. These applications are hereby incorporated by reference herein.

FIELD OF THE INVENTION

This disclosure relates to systems and methods for determining a distribution in a greenhouse of values of an environmental parameter, such as temperature, carbon dioxide concentration and humidity. In particular to such methods wherein air flow measurements at first one or more positions are used to determine values of the environmental parameter at third one or more positions, wherein the third one or more positions are different from second one or more positions at which environmental sensors measure the environmental parameter. This disclosure further relates to a system for performing such method, as well as a computer program for performing such method and a computer-readable medium having stored such computer program.

BACKGROUND OF THE INVENTION

Greenhouse farmers, despite having a wide range of monitoring tools, still experience difficulty in correctly measuring the environmental parameters inside the greenhouse, especially how the environmental parameters vary throughout the greenhouse. Therefore, greenhouse farmers for example still need to be present in the greenhouse to for example correctly feel the temperature in the greenhouse, which may exhibit local variations that remain hidden unnoticed by the existing monitoring tools. However, such local variations may cause that some plants experience a too low or too high temperature, which can be detrimental for their growth and development.

Also, greenhouse farmers experience difficulties in correctly managing the carbon dioxide concentration in the greenhouse. As is known, plants require carbon dioxide to grow and it is easily understood that therefore the carbon dioxide concentration should be at an appropriate level throughout the entire greenhouse. Else, plants in some parts of the greenhouse may experience suboptimal carbon dioxide concentrations, which may also limit their growth and development.

US 2020/0134741A1 discloses techniques of controlling an agricultural system and describes how the number and position of sensors across a farm can be improved to provide optimal coverage. The sensor location and sensor data may be used in a digital twin of the farm to control the growth of plants and may also be used to create a "heat map" of measured quantities.

A disadvantage of this method is that it still requires relatively many sensors to get a detailed heat map that correctly indicates local variations as well. Hence, there is a need in the art for technology that enables to determine a detailed distribution in a greenhouse of values of an environmental parameter.

SUMMARY OF THE INVENTION

Therefore, one aspect of this disclosure relates to a system for determining a distribution in a greenhouse of values of an environmental parameter. The system comprises one or more air flow sensors for measuring a magnitude and/or direction of air flow at first one or more positions in the greenhouse. The system further comprises one or more environmental sensors for measuring the environmental parameter at second one or more positions in the greenhouse. The system also comprises a data processing system that is configured to receive first signals from the one or more air flow sensors. The first signals are indicative of the respective magnitudes and/or directions of air flow at the respective first one or more positions in the greenhouse. The data processing system is also configured to receive second signals from the one or more environmental sensors. The second signals are indicative of the respective values of the environmental parameter at the respective second one or more positions in the greenhouse. The data processing system is also configured to determine, based on the first signals and based on the second signals, values of the environmental parameter at third one or more positions in the greenhouse thus determining the distribution in the greenhouse of values of the environmental parameter. Herein the third one or more positions are different from the second one or more positions.

A computer-implemented method for determining a distribution in a greenhouse of values of an environmental parameter. The method comprises receiving first signals from the one or more air flow sensors configured to measure a magnitude and/or direction of air flow at first one or more positions in the greenhouse. The first signals are indicative of the respective magnitudes and/or directions of air flow at the respective first one or more positions in the greenhouse. The method also comprises receiving second signals from the one or more environmental sensors that are configured to measure the environmental parameter at second one or more positions in the greenhouse. The second signals re indicative of the respective values of the environmental parameter at the respective second one or more positions in the greenhouse. The method also comprises determining, based on the first signals and based on the second signals, values of the environmental parameter at third one or more positions in the greenhouse thus determining the distribution in the greenhouse of values of the environmental parameter. Herein the third one or more positions are different from the second one or more positions.

This system and this method enable to determine a detailed distribution of values of the environmental parameter in the greenhouse with a relatively limited number of sensors. The air flows in the greenhouse influence the distribution of the environmental parameters in the greenhouse in manners that are, at least to some extent, predictable. Therefore, if the air flows in the greenhouse are known and the values of the environmental parameter at the respective second one or more positions in the greenhouse have been measured, then the values at other positions in the greenhouse, referred to herein as the third one or more positions in the greenhouse, can be more accurately determined. Such determination is for example far more accurate than a determination that is based on the mere assumption that a constant gradient applies for the environmental parameter between two positions having respective environmental sensors. To illustrate, it could very well be that an air flow is present in the greenhouse that follows a specific path through the greenhouse from a heat source, such as a radiator, to an open window. Then clearly, such air flow can cause local temperature variations at positions in the greenhouse that would remain unnoticed if the existence of this air flow would be unknown and no temperature sensors would be present at those positions.

As used herein, the third one or more positions being different from the second one or more positions may be understood to indicate that the third one or more positions comprise at least one position that is not one of the second one or more positions.

The environmental parameter may be temperature or carbon dioxide concentration or humidity, or any other environmental parameter. These are environmental parameters that are particularly of interest to an operator of a greenhouse because these significantly influence the growth and development of plants. To illustrate, humidity relates to vapour pressure deficit (VPD), which is the difference (deficit) between the amount of moisture in the air and how much moisture the air can hold when it is saturated. Greenhouse farmers nowadays are interested in VPD. Further, the above mentioned environmental parameters are suitable to be the subject in the system and method disclosed herein, because they are directly influenced by air flows.

The one or more air flow sensors may comprise one or more sensors that are configured to measure movement of one or more plants or plant parts, such as leaves, positioned at or near said first one or more positions in the greenhouse.

Such movement may namely be indicative of the respective magnitude values and/or direction values of air flow at the respective first one or more positions.

The one or more sensors are for example cameras that are configured to capture one or more videos of plants at the first one or more positions. Subsequent analysis of the one or more videos may then yield magnitude values and/or direction values for the air flow at the first one or more positions in the greenhouse. In such embodiment, of course, the time resolution and image resolution of the one or more videos are sufficiently high so that indeed such analysis can be performed.

In an embodiment, the one or more sensors comprised by the one or more air flow sensors comprise one or more radio frequency sensors that are configured to measure movement of one or more plants or parts thereof positioned at or near said first one or more positions in the greenhouse. This embodiment may be implemented using radio frequency sensors that have already been installed in the greenhouse.

The one or more radio frequency sensors may be comprised in one or more illumination devices for illuminating plants in the greenhouse. This would enable to make use of the radio frequency sensors that are typically already present in the illumination devices. The radio frequency sensors in this embodiment may be configured to both receive control instructions for the illumination device in which the sensor is installed. This would mean that the radio frequency is efficiently used for at least two functions, namely for receiving control instructions and for measuring movement of one or more plants or parts thereof.

The control instructions for example indicate an intensity level and/or one or more wavelengths or wavelength ranges for the light illuminated by the illumination device. These control instructions may be transmitted by a data processing system that is controlled by the operator of the greenhouse.

In an embodiment of the system, the data processing system is configured to apply a fluid mechanics model, such as a computational fluid dynamics model, for determining the distribution in the greenhouse of values of the environmental parameter. Likewise, the computer implemented method may comprise applying a fluid mechanics model for determining the distribution in the greenhouse of values of the environmental parameter. In these embodiments, the magnitudes and/or directions of air flow at each of the first one or more positions in the greenhouse serve as boundary conditions for the fluid mechanics model. Further, the values of the environmental parameter at the second one or more positions in the greenhouse also serve as boundary conditions for the fluid mechanics model.

Further boundary conditions for the fluid mechanics model may include:

- one or more positions in the greenhouse of one or more respective heat sources; and/or
- one or more rates of heat provision of one or more respective heat sources; and/or
- one or more positions in the greenhouse of one or more respective cold sources; and/or
- one or more rates of cold provision of one or more respective cold sources; and/or
- one or more positions in the greenhouse of one or more respective carbon dioxide sources; and/or
- one or more rates of carbon dioxide rate provision of one or more respective carbon dioxide sources; and/or
- one or more positions in the greenhouse of one or more respective humidity sources; and/or
- one or more rates of humidity provision of one or more respective humidity sources; and/or
- one or more positions in the greenhouse of one or more respective humidity drains; and/or
- one or more rates of humidity withdrawal of one or more respective humidity drains; and/or
- one or more positions of respective windows that can be opened; and/or
- one or more states of respective windows, for example that a first window is open and that a second window is closed; and/or
- one or more positions of respective structural greenhouse elements, such as walls, ceilings, doors, et cetera, and/or
- environmental parameters outside of and preferably in the vicinity of the greenhouse.

The states for the respective windows may indicate current states, but this is not required. Further, environmental parameters outside of and preferably in the vicinity of the greenhouse may be based on a weather forecast for the area where the greenhouse is located.

The fluid mechanics model can in principle be any fluid mechanics model known in the art. In embodiment, the fluid mechanics model is a computation fluid mechanics model in the sense that it is based on numerical calculations.

In an embodiment of the system, the data processing system comprises a display device for displaying information to a user. In an embodiment, the method comprises displaying information to a user using a display device.

In an embodiment, the system comprises an input device for receiving user instructions. Likewise, in an embodiment, the method comprises receiving user instructions via an input device.

In an embodiment, the data processing system is configured to present the determined distribution in the greenhouse of the environmental condition using said display device, preferably in the form of a two-dimensional or three-dimensional heat map. In an embodiment, the method comprises presenting the determined distribution in the greenhouse of the environmental condition using a display device, preferably in the form of a two-dimensional or three-dimensional heat map.

A heat map referred to herein may be understood to be a data visualization technique that shows the values of the environmental parameter as color or color intensity.

In an embodiment, the data processing system is configured to determine one or more actions for improving the distribution in the greenhouse of values of the environmental parameter, based on the determined distribution in the greenhouse of values of the environmental parameter. In such embodiment, the data processing system may be further configured to present the determined one or more actions using said display device.

In an embodiment, the method comprises determining one or more actions for improving the distribution in the greenhouse of values of the environmental parameter, based on the determined distribution in the greenhouse of values of the environmental parameter. In such embodiment, the method may further comprise presenting the determined one or more actions using the display device.

An action for improving the distribution for example is opening a window and/or increasing or decreasing a rate of heat provision of one or more heat sources and/or increasing or decreasing a rate of carbon dioxide provision of one or more carbon dioxide sources. By presenting the actions using the display device, a user, such as an operator of the greenhouse, is easily informed how he or she can effectively improve the distribution of values of the environmental parameter in the greenhouse.

Determining an action for improving the distribution may be performed as follows:

- determining a first action that would cause a first change in at least a first boundary condition that is used for determining the distribution in the greenhouse of values of the environmental parameter, and determining a first distribution of the environmental parameter in the greenhouse in accordance with methods described herein and based on the changed first boundary condition, and
- determining a second action that would cause a second change in at least a second boundary condition that is used for determining the distribution in the greenhouse of values of the environmental parameter, and determining the distribution of the environmental parameter in the greenhouse in accordance with methods described herein and based on the changed second boundary condition, and
- comparing the first and second determined distribution, and determining that the first, respectively second, distribution is more favourable than the second, respectively first, distribution and determining the first, respectively second, action as action for improving the distribution.

Thus, this embodiment enables the system to assess how various actions influence the distribution of the environmental parameter in the greenhouse.

The first and second boundary condition may be the same boundary condition. However, in such case, the first and second change are different. The first change for example relates to an increase of the heat provisioning rate of one of the heat sources by a first amount and the second change for example relates to an increase of the heat provisioning rate of the same heat source by a second amount that is different from the first amount.

In an embodiment, the system comprises an actuator system that comprises one or more actuators for influencing the distribution in the greenhouse of values of the environmental parameter.

In an embodiment, the method comprises controlling an actuator system to change the distribution in the greenhouse of values of the environmental parameter, wherein the actuator system comprises one or more actuators for influencing the distribution in the greenhouse of values of the environmental parameter.

Examples of such actuators are actuators that are configured to cause a window to open or close, actuators that are configured to change a rate of heat provision of a heat source, actuators that are configured to change a rate of carbon dioxide provision of a carbon dioxide source.

In an embodiment, the data processing system is configured to control the actuator system to change the distribution in the greenhouse of values of the environmental parameter, based on the determined distribution in the greenhouse of values of the environmental parameter.

In an embodiment, the method comprises controlling the actuator system to change the distribution in the greenhouse of values of the environmental parameter, based on the determined distribution in the greenhouse of values of the environmental parameter.

These embodiments enable to automatically adapt the circumstances, boundary conditions, in order to improve the distribution without human intervention.

In an embodiment, the data processing device comprises an input device for receiving user instructions. In such embodiment, the data processing device may be configured to receive user instructions via the input device and control the actuator system to change the distribution in the greenhouse of values of the environmental parameter, based on the received user instructions.

In an embodiment, the method comprises receiving user instructions via an input device and controlling the actuator system to change the distribution in the greenhouse of values of the environmental parameter, based on the received user instructions.

As explained above, one or more actions for improving the distribution may be presented using a display device. The user instructions may simply represent a selection of one or more of the presented actions. The input device and display device may together be implemented as a touch-sensitive screen. This allows a user to select a presented action on the screen by simply touching the screen at the position where the action is presented.

One aspect of this disclosure relates to a computer program comprising instructions to cause the system according to any embodiment described herein to execute the steps of the method according any embodiment described herein.

One aspect of this disclosure relates to a computer-readable medium having stored thereon the computer program.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems, e.g. to an existing data processing system according to an embodiment or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE EMBODIMENTS

In the figures identical reference numbers indicates identical or similar elements.

Figures 1A, 1B:
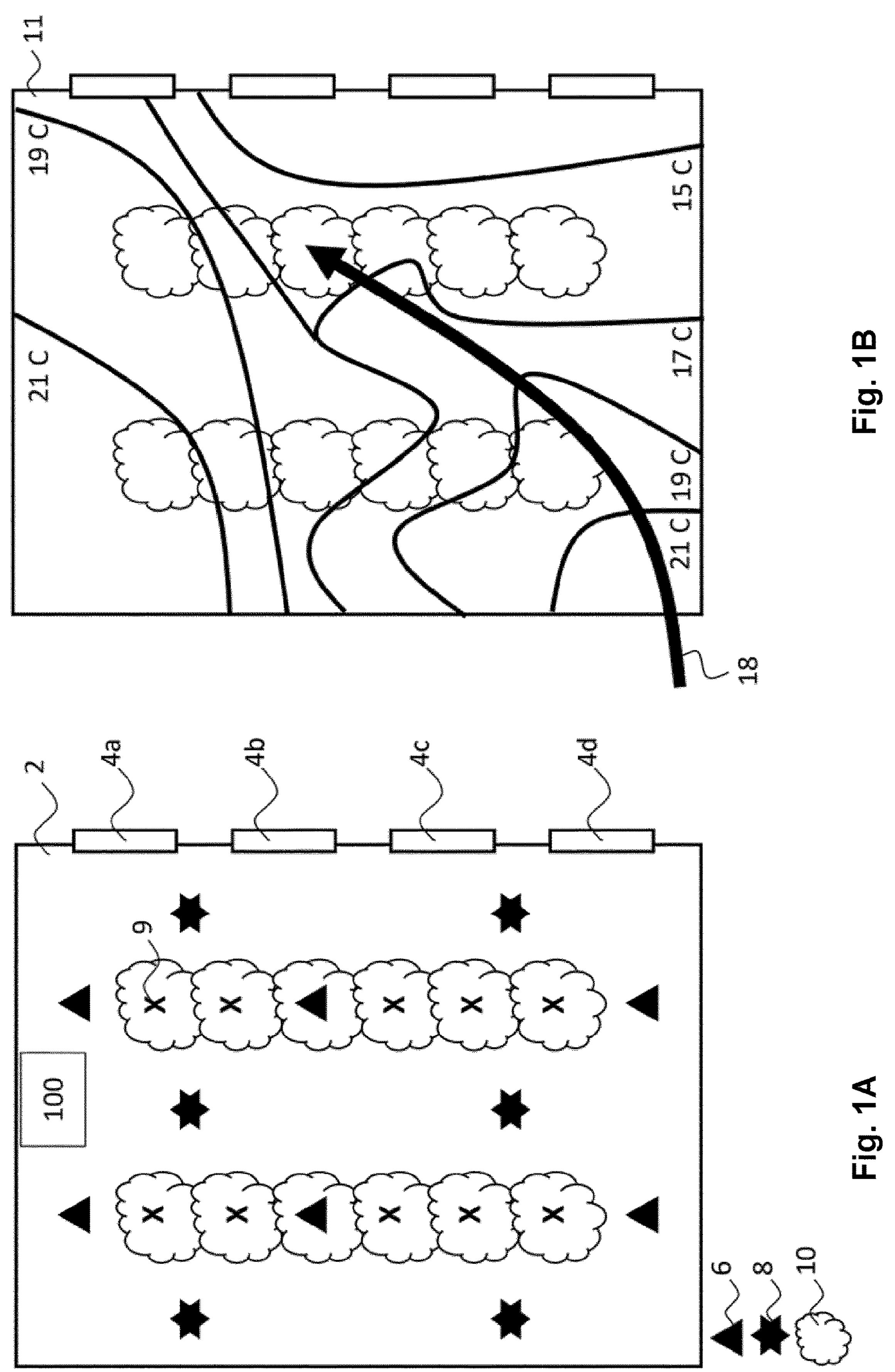
FIG. 1A schematically shows a top view of a greenhouse comprising a system according to an embodiment.
FIG. 1B shows a distribution of an environmental parameters as determined in accordance with a method according to an embodiment.

FIG. 1A schematically shows a top view of a greenhouse 2. The greenhouse comprises a system for determining a distribution in a greenhouse of values of an environmental parameter. A number of plants are present in the greenhouse and the depicted greenhouse 2 comprises a number of openable windows 4*a*-4*d*. Preferably, the environment in the greenhouse 2 is optimal for these plants, i.e. appropriate temperature, appropriate humidity, appropriate carbon dioxide concentration, etc. This enables the plants to fully grow and develop. Typically, the plants are plants that produce food for consumption, such as tomatoes. Clearly, by ensuring that such plants fully grow and develop, their consumable parts also develop, which ensures a high yield for the greenhouse.

The greenhouse 2 comprises a system that comprises one or more air flow sensors 6 for measuring a magnitude and-or direction of air flow at first one or more positions. These one or more positions are indicated by the triangular symbols in FIG. 1A. In the depicted embodiment, there is one air flow sensor positioned at each position of the first positions. However, there may also be embodiments wherein a single air flow sensor can measure the magnitude and/or direction of the air flow at multiple positions, for example in a certain region. An example of such an embodiment is where an air flow sensor is configured to measure movement of one or more plants or plant parts, such as leaves, positioned at or near said first one or more positions in the greenhouse. A single air flow sensor may namely be capable of measuring such plant movements for several positions, e.g. in a region in the greenhouse 2. To illustrate, an air flow sensor 6 may comprises a camera that is configured to capture video of a region of the greenhouse and monitors the movements of plants or parts thereof in this region based on which the magnitude and/or direction of the air flow in this region can be determined.

An air flow sensor 6 may also comprise a radio frequency sensor known in the art for measuring movement of one or more plants or parts thereof. The air flow sensors 6 may also be present in illumination devices that are configured to illuminate the plants in the greenhouse. Typically, such illumination devices are positioned near, e.g. above, the plants and are typically used to cause an appropriate lighting condition for the plants.

Said system further comprises one or more environmental sensors 8 for measuring an environmental parameter at second one or more positions in the greenhouse. Examples of environmental parameters are

- temperature;
- carbon dioxide concentration;
- humidity, e.g. relative humidity;
- concentration of Volatile Organic Compounds (VOCs).

The second one or more positions are indicated in FIG. 1A by the star symbols. Typically, each position of the second one or more positions comprises an environmental sensor, however this is not necessarily the case. To illustrate, thermal imaging may be employed to measure the temperature at multiple positions, e.g. in a region.

Further, the system comprises a data processing system 100. Of course, the data processing system needs not be present in the greenhouse per se. The data processing system 100 for example is a server. The data processing system 100 may also be a smart phone carried by the operator of the greenhouse. The data processing system 100 may also be distributed in the sense that some elements, such as sensors, input devices, display devices are physically present at one location, whereas other elements, such as a computer-readable storage are physically present at another location.

Figure 1C:
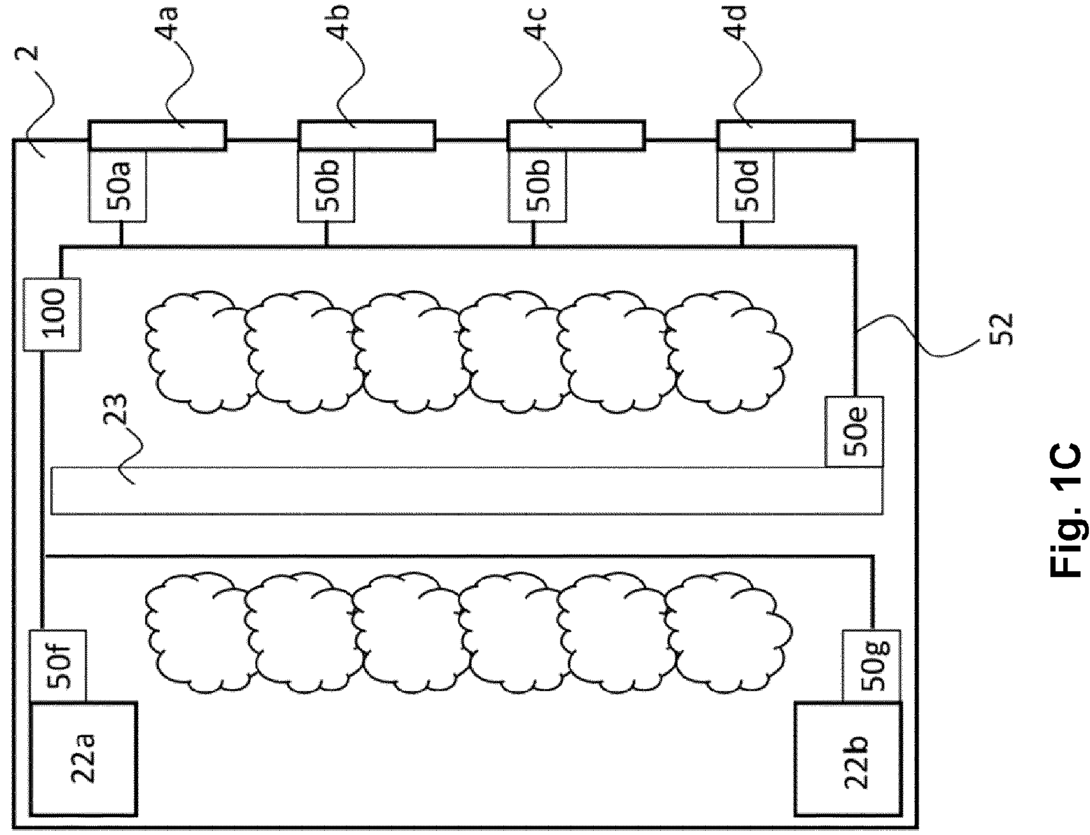
FIG. 1C illustrates a system comprising an actuator system according to an embodiment.
Figure 2C:
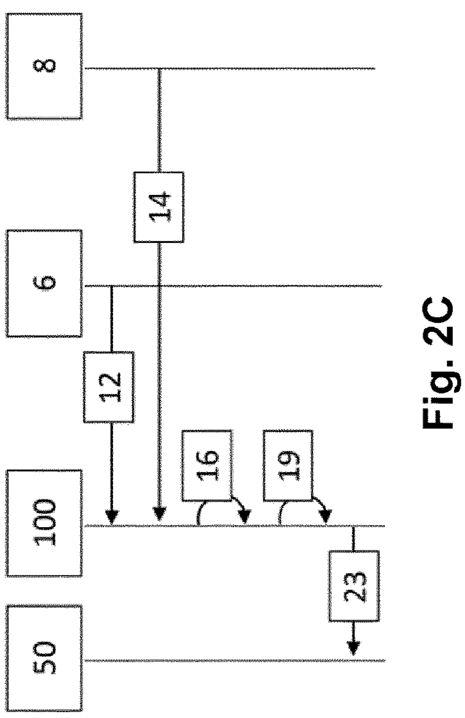
FIG. 2C illustrates a method according to an embodiment wherein a data processing system is configured to control an actuator system.
Figure 2D:
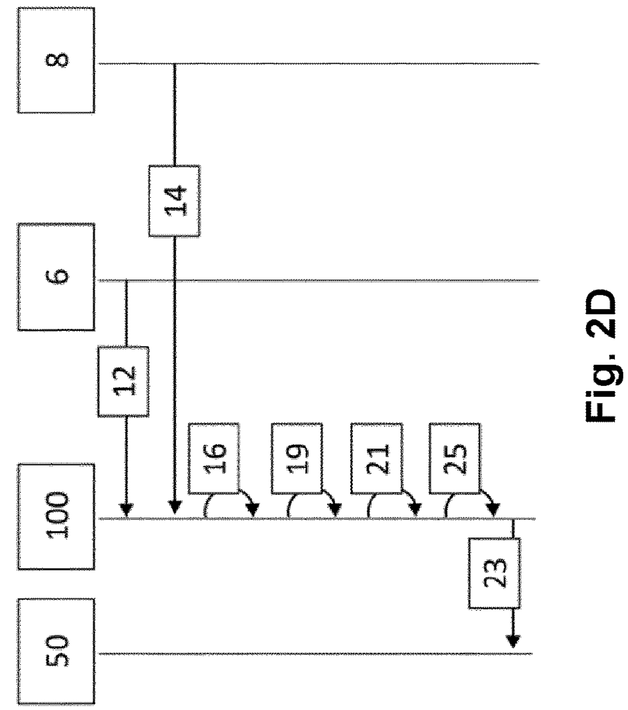
FIG. 2D illustrates an embodiment wherein determined actions are presented to a user for selection using a display device.
Figure 2A:
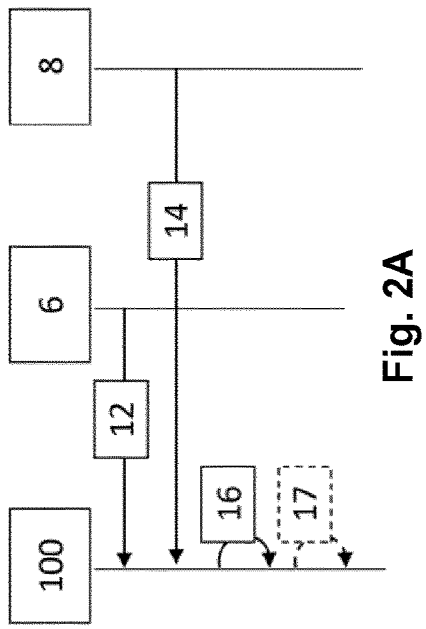
FIG. 2A illustrates a method according to an embodiment.

As shown in FIG. 2A, the data processing system 100 is configured to receive first signals 12 from the one or more air flow sensors 6 and second signals 14 from the one or more environmental sensors 8. The first signals 12 are indicative of the respective magnitudes and/or directions of air flow at the respective first one or more positions in the greenhouse 2. The second signals 14 are indicative of the respective values of the environmental parameter at the respective second one or more positions in the greenhouse 2. Preferably, the first and second signals are transmitted repeatedly to the data processing system so that the air and the environmental parameter, respectively, can be continuously monitored. Further, the data processing system 100 is configured to determine (step 16), based on the first signals and based on the second signals, values of the environmental parameter at third one or more positions in the greenhouse thus determining the distribution in the greenhouse of values of the environmental parameter. In FIG. 1, as an example, third one or more positions are indicated by the crosses 9. Clearly, the third one or more position are different from the second one or more positions where the environmental parameter is actually measured. As shown in FIG. 2A, optionally, the data processing system performs a step 17 of presenting the determined distribution in the greenhouse of the environmental condition using a display device, preferably in the form of a two-dimensional or three-dimensional heat map.

Thus, the system and methods described herein enable to determine a detailed distribution for an environmental parameter without relatively many environmental sensors being present in the greenhouse 2. FIG. 1B is an example of a detailed distribution 11 of temperature that has been determined in accordance with the methods described herein. It should be appreciated that although a two-dimensional temperature distribution is depicted, the determined distribution may be a three-dimensional distribution. The depicted distribution is a temperature distribution. In this example, actually an air flow 18 is present in the greenhouse 2. Such an air flow may cause variations in the temperature distribution as shown. In particular, the air flow transports heat along its path causing relatively higher temperatures along its path. By measuring at least part of this air flow 18, a more detail temperature distribution can be determined than without measuring this air flow and using only temperature sensors.

FIG. 1C illustrates that the system may comprise an actuator system 50 comprising one or more actuators 50*a*-50*g* for influencing the distribution in the greenhouse of values of the environmental parameter.

In the depicted embodiment, the greenhouse 2 comprises one or more heat sources 22*a* and 22*b* and one or more carbon dioxide sources 23.

In the depicted embodiment, the actuator system comprises actuators 50*a*-50*d* for controlling respectively windows 4*a*-4*d*. These actuators 4*a*-4*d* are preferably configured to control a state of a window. To illustrate, these actuators may be configured to open and close a window. Additionally or alternatively, these actuators may be configured to cause the windows to be in a state in which it substantially blocks light from the outside, and configured to cause the windows to leave such state. To illustrate, the actuators may be configured to cause window blinds to go up or down.

In the depicted embodiment, actuator 50*a* is configured to control the carbon dioxide source 23 in the sense that it can control the rate at which carbon dioxide source 23 provides carbon dioxide in the greenhouse. An example of such actuator is a valve that can be opened or closed in order to control the flow of carbon dioxide into the greenhouse.

Further, the actuator system of the depicted embodiment comprises actuators 50*f* and 50*g* for controlling respectively heat sources 22*a* and 22*b*.

The data processing system 100 is preferably configured to control the actuators, for example by means of control connections 52 as indicated. It should be appreciated that these connections may be wired connections or wireless connections. For example, both the data processing system and actuators 50*a*-50*g* may be connected to the same server device, e.g. by being connected to the same wife network.

Figure 2B:
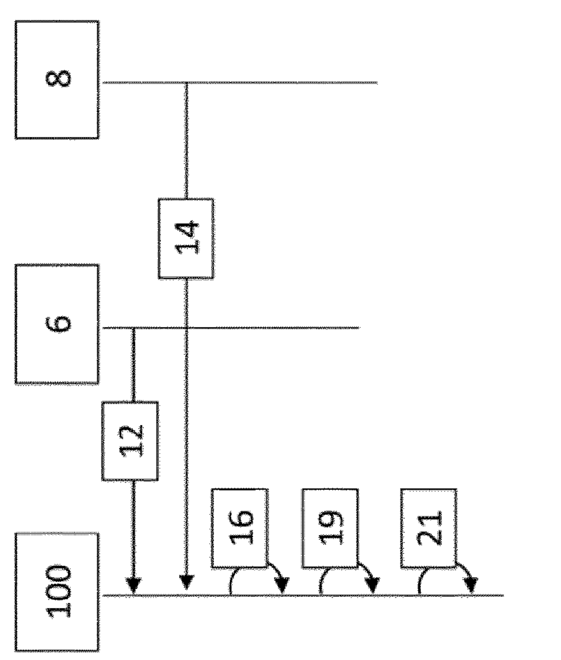
FIG. 2B illustrates a method according to an embodiment that comprises determining one or more actions for improving the distribution in the greenhouse.

FIG. 2B illustrates an embodiment that comprises beside receiving the first (stet 12) and second (step 14) signals and determining (step 16) the distribution, determining (step 19) one or more actions for improving the distribution in the greenhouse of values of the environmental parameter, based on the determined distribution in the greenhouse of values of the environmental parameter. This embodiment further comprises step 21 that comprises presenting the determined one or more actions using a display device.

FIG. 2C illustrates an embodiment wherein the data processing system is configured to control an actuator system 50 for changing, preferably improving, the distribution, e.g. the temperature distribution, in the greenhouse, preferably based on the distribution that was determined in step 16. In the depicted embodiment, the determined one or more actions in step 19 are not presented on a display device. The data processing system in this embodiment automatically, without human interference, instructs the actuator system 50.

FIG. 2D illustrates an embodiment, wherein the one or more actions are presented on a display dive (step 21). Then, this embodiment comprises, in step 25, receiving user instructions via an input device of the data processing system. Preferably, the user instructions are formed by the user selecting one or more of the presented actions. Then, in step 23, the data processing system 100 controls the actuator system in accordance with the received user instructions.

Figure 3:
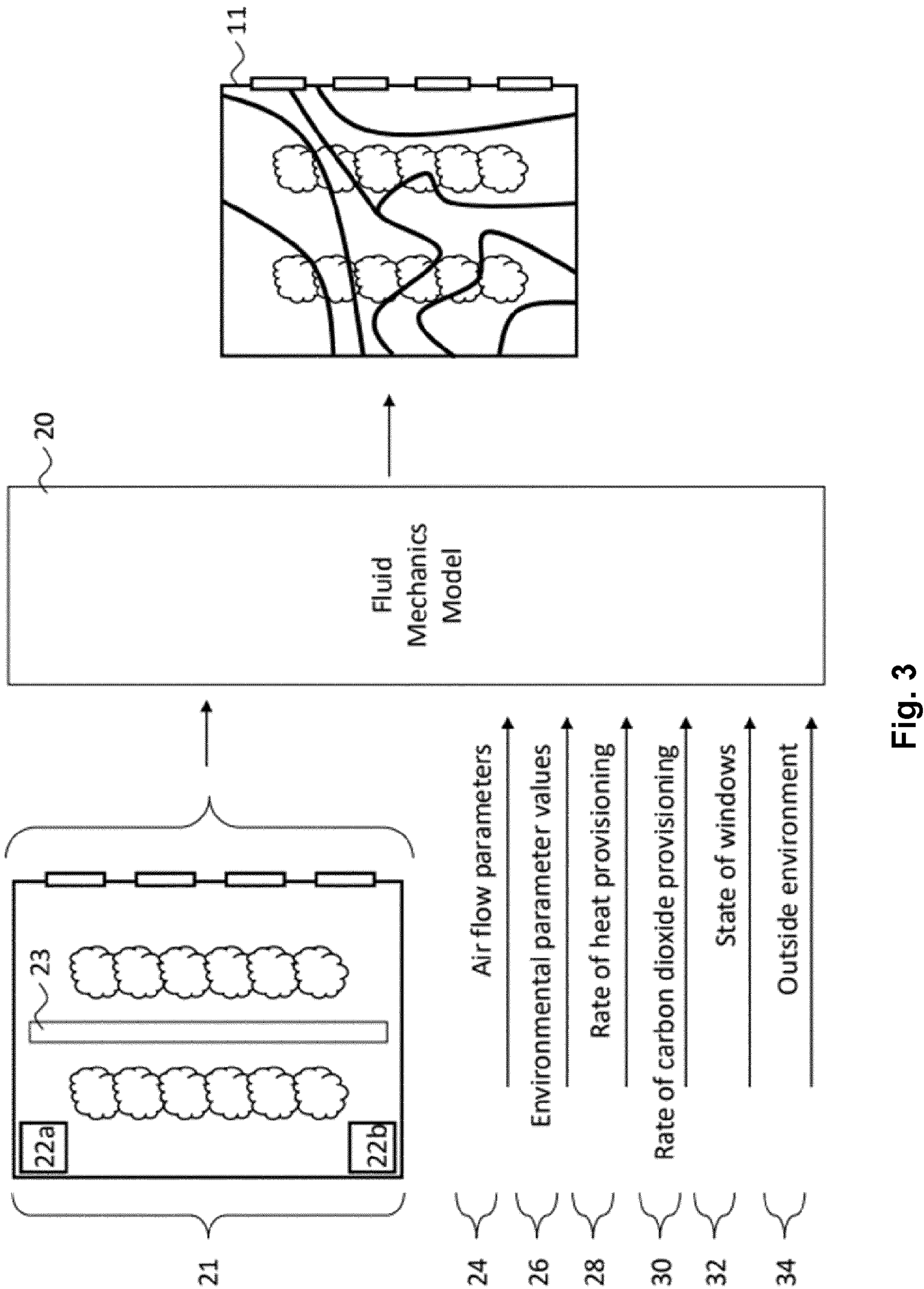
FIG. 3 schematically illustrates the application of a fluid mechanics model.

FIG. 3 illustrates that the data processing system may be configured to apply a fluid mechanics model 24 for determining the distribution 11 in the greenhouse of values of the environmental parameter. As known in the art, such fluid mechanics model 20 may employ numerical methods because the problems are mathematically very complex. Such fluid mechanics model uses the magnitudes and/or directions of air flow at each of the first one or more positions in the greenhouse as boundary condition 24. Further, the values of the environmental parameter at the second one or more positions in the greenhouse 2 also serve as boundary conditions 26.

Preferably, one or more positions of respective structural greenhouse elements, such as walls, ceilings, doors, windows et cetera, indicated by 21 are also provided as input. To illustrate, it may be that the greenhouse has one or more heat sources 22*a* and 22*b* and one or more carbon dioxide sources 23. It is of course beneficial for the accuracy of the determined distribution if the model uses such input 21 as input as well.

Further boundary conditions for the fluid mechanics model may include:

- one or more rates of heat provision of one or more respective heat sources, indicated by 28; and/or
- one or more positions in the greenhouse of one or more respective cold sources; and/or
- one or more rates of cold provision of one or more respective cold sources; and/or
- one or more rates of carbon dioxide rate provision of one or more respective carbon dioxide sources, indicated by 30; and/or
- one or more positions in the greenhouse of one or more respective humidity sources; and/or
- one or more rates of humidity provision of one or more respective humidity sources; and/or
- one or more positions in the greenhouse of one or more respective humidity drains; and/or
- one or more rates of humidity withdrawal of one or more respective humidity drains; and/or
- one or more states of respective windows, indicated by 32, for example that a first window is open and that a second window is closed; and/or
- environmental parameters outside of and preferably in the vicinity of the greenhouse, indicated by 34.

Figures 4, 5:
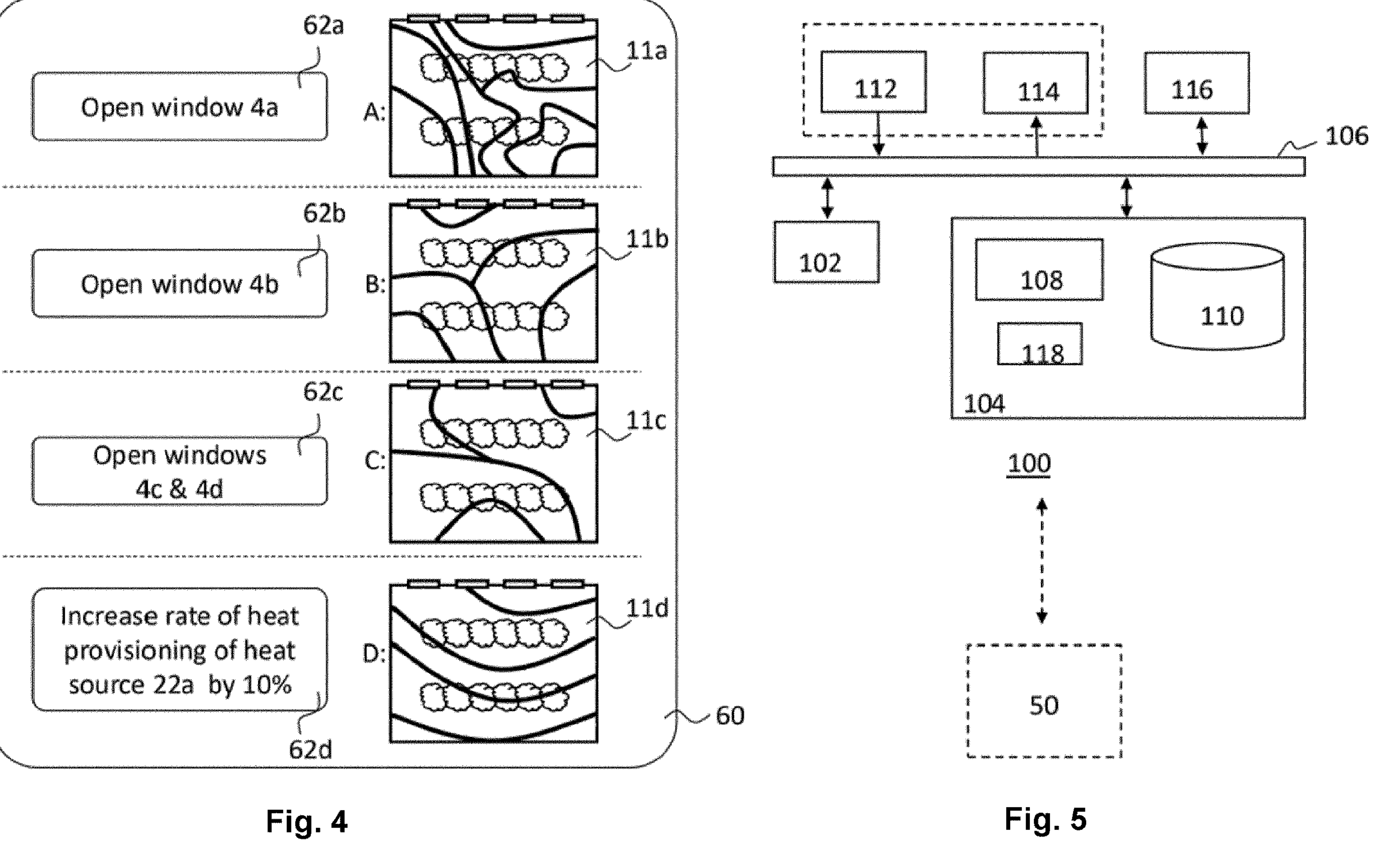
FIG. 4 illustrates a user interface of the system according to an embodiment.
FIG. 5 depicts a block diagram illustrating a data processing system according to an embodiment.

FIG. 4 illustrates a touch sensitive display device 60 that therefore may be regarded as a combined input and output device of the data processing system 100. The display device 60 is shown in FIG. 4 to present actions 62*a*-62*d* for changing the distribution of for example carbon dioxide or temperature in the greenhouse. Action 62*a* for example involves opening a window, whereas action 62*d* for example involves increasing a rate of heat provisioning of a particular heat source. Action 62*c* for example involves opening two windows.

In the depicted embodiment, in association with, e.g. next to, each determined action is presented an indication 11*a*-11*d* of the distribution as it is expected to be after the action. This allows the operator to see which action would yield the most favourable distribution.

Of course, the system itself may have stored the most favourable distribution and therefore may be configured to make the selection by itself, without presenting the actions to the user. Such may for example be the case in an embodiment as depicted in FIG. 2C.

Since the depicted display device 60 is touch-sensitive, a user may simply select any one or more of the actions 62*a*-62*d* by simply touching it. As a consequence, the data processing system 100 may control the actuator system 50 accordingly.

FIG. 5 depicts a block diagram illustrating a data processing system according to an embodiment.

As shown, the data processing system is optionally connected to an actuator system 50 as described herein comprising one or more actuators for influencing the distribution in the greenhouse of values of the environmental parameter. The data processing system 100 may thus control the actuator system 50 to change the distribution in the greenhouse of values of the environmental parameter.

As shown in FIG. 5, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, or the like. Examples of output devices may include, but are not limited to, a display device as described herein, such as a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 5, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 5) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining a distribution in a greenhouse of values of an environmental parameter, the system comprising one or more air flow sensors for determining a magnitude and/or direction of air flow at first one or more positions in a first region of the greenhouse, and one or more environmental sensors for measuring the values of the environmental parameter at second one or more positions in the first region of the greenhouse, at least one actuator configured to influence the distribution in the first region of the greenhouse of values of the environmental parameter, and a data processing system that is configured to receive first signals from the one or more air flow sensors, the first signals being indicative of the respective magnitudes and/or directions of air flow at the respective first one or more positions in the first region of the greenhouse, and receive second signals from the one or more environmental sensors, the second signals being indicative of the respective values of the environmental parameter at the respective second one or more positions in the first region of the greenhouse, assigning the magnitudes and/or directions of air flow at each of the first one or more positions in the first region of the greenhouse and the values of the environmental parameter at the second one or more positions in the first region of the greenhouse as boundary conditions for a fluid mechanics model, applying the fluid mechanics model to determine, based on the the boundary conditions, values of the environmental parameter at third one or more positions in the first region of the greenhouse thus determining the distribution in the first region of the greenhouse of values of the environmental parameter, wherein the third one or more positions are different from the second one or more positions, determining a first action that would cause a change to at least one of the boundary conditions and to the distribution in the first region of the greenhouse of values of the environmental parameter, and operate the at least one actuator in accordance with the first action causing a change to the distribution in the first region of the greenhouse of values of the environmental parameter based on the distribution in the first region of the greenhouse of values of the environmental parameter determined, wherein the at least one actuator comprises at least one of:

a) an actuator configured to cause window blinds to go up;

b) an actuator configured to cause window blinds to go down;

c) an actuator configured to cause a window to open;

d) an actuator configured to cause a window to close;

e) an actuator configured to cause a window to substantially block light from outside;

f) an actuator configured to cause a window to substantially allow light from outside;

g) an actuator configured to increase a rate of heat provisioning of a heat source;

h) an actuator configured to decrease a rate of heat provisioning of a heat source;

i) an actuator configured to increase a rate of carbon dioxide provisioning of a carbon dioxide source; and j) an actuator configured to decrease a rate of carbon dioxide provisioning of a carbon dioxide source.

2. The system according to claim 1, wherein the environmental parameter is temperature or carbon dioxide concentration or humidity.

3. The system according to claim 1, wherein the one or more air flow sensors comprise one or more sensors that are configured to monitor movement of one or more plants or plant parts positioned at or near said first one or more positions in the first region of the greenhouse.

4. The system according to claim 3, wherein the one or more sensors comprise one or more radio frequency sensors that are configured to monitor movement of the one or more plants or part thereof positioned at or near said first one or more positions in the first region of the greenhouse.

5. The system according to claim 4, wherein the one or more radio frequency sensors are comprised in one or more illumination devices for illuminating plants in the first region of the greenhouse.

6. The system according to claim 1, wherein the data processing system comprises a display device for displaying information to a user.

7. The system according to claim 6, wherein the data processing system is configured to:

present the determined distribution in the first region of the greenhouse of values of the environmental parameter at said third one or more positions in the first region of the greenhouse using said display device in a two-dimensional or three-dimensional heat map.

8. The system according to claim 6, wherein the data processing system is configured to:

present the first action using said display device.

9. The system according to claim 8, wherein presenting the first action using said display device further comprises: presenting an indication of an expected distribution after performing the first action.

10. The system according to claim 1, further comprising an actuator system comprising the at least one actuator and one or more second actuators for influencing the distribution in the greenhouse of values of a second, different environmental parameter.

11. The system according to claim 10, wherein the data processing system is configured to control the actuator system to change the distribution in the first region of the greenhouse of values of the environmental parameter, based on the determined distribution in the first region of the greenhouse of values of the environmental parameter at said third one or more positions in the first region of the greenhouse.

12. The system according to claim 1, wherein the data processing system comprises an input device for receiving user instructions and wherein the data processing system is configured to:

receive user instructions via the input device, and operate at least one actuator to change the distribution in the first region of the greenhouse of values of the environmental parameter, based on the received user instructions.

13. The system according to claim 1, wherein operating the at least one actuator comprises at least one of:

a) causing window blinds to go up;

b) causing the window blinds to go down;

c) opening a window;

d) closing the window;

e) changing a state of a window to substantially block light from outside;

f) changing the state of the window to substantially allow light from outside;

g) increasing a rate of heat provisioning of a heat source;

h) decreasing the rate of heat provisioning of the heat source;

i) increasing a rate of carbon dioxide provisioning of a carbon dioxide source; and j) decreasing the rate of carbon dioxide provisioning of the carbon dioxide source.

14. The system according to claim 1, wherein the data processing system is further configured to:

determine at least one other action that would cause a different change to at least one of the boundary conditions and to the distribution in the first region of the greenhouse of values of the environmental parameter, and automatically select a selected action of the first action and the at least one other action, and control the at least one actuator to change the distribution in the first region of the greenhouse of values of the environmental parameter, based on the selected action.

15. The system according to claim 14, wherein selecting the selected action is based on a stored distribution in the first region of the greenhouse of values of the environmental parameter.

16. A computer-implemented method for determining a distribution in a greenhouse of values of an environmental parameter, the method comprising:

receiving first signals from one or more air flow sensors configured to determine a magnitude and/or direction of air flow at first one or more positions in a first region of the greenhouse, the first signals being indicative of the respective magnitudes and/or directions of air flow at the respective first one or more positions in the first region of the greenhouse, and receiving second signals from one or more environmental sensors that are configured to measure a value of the environmental parameter at second one or more positions in the first region of the greenhouse, the second signals being indicative of the respective values of the environmental parameter at the respective second one or more positions in the first region of the greenhouse, assigning the magnitudes and/or directions of air flow at each of the first one or more positions in the first region of the greenhouse and the values of the environmental parameter at the second one or more positions in the first region of the greenhouse as boundary conditions for a fluid mechanics model, applying a fluid mechanics model to determining, based on the boundary conditions, values of the environmental parameter at third one or more positions in the first region of the greenhouse thus determining the distribution in the first region of the greenhouse of values of the environmental parameter, wherein the third one or more positions are different from the second one or more positions, determining a first action that would cause a change to at least one of the boundary conditions and to the distribution in the first region of the greenhouse of values of the environmental parameter, and operating at least one actuator in accordance with the first action causing a change to the distribution in the first region of the greenhouse of values of the environmental parameter based on the distribution in the first region of the greenhouse of values of the environmental parameter determined, wherein the at least one actuator comprises at least one of:

a) an actuator configured to cause window blinds to go up;

b) an actuator configured to cause window blinds to go down;

c) an actuator configured to cause a window to open;

d) an actuator configured to cause a window to close;

e) an actuator configured to cause a window to substantially block light from outside;

f) an actuator configured to cause a window to substantially allow light from outside;

g) an actuator configured to increase a rate of heat provisioning of a heat source;

h) an actuator configured to decrease a rate of heat provisioning of a heat source;

i) an actuator configured to increase a rate of carbon dioxide provisioning of a carbon dioxide source; and j) an actuator configured to decrease a rate of carbon dioxide provisioning of a carbon dioxide source.

17. A non-transitory computer readable medium comprising instructions, the instructions when executed by a processor of a system for determining a distribution in a greenhouse of values of an environmental parameter cause the system to perform the method of claim 16.

* * * * *